US007235946B2

(12) United States Patent
Park

(10) Patent No.: US 7,235,946 B2
(45) Date of Patent: Jun. 26, 2007

(54) ACTUATOR CURRENT CONTROL METHOD

(75) Inventor: Min Woo Park, Seongnam-si (KR)

(73) Assignee: Mando Corporation, Seoul (KR)

( * ) Notice: Subject to any disclaimer, the term of this patent is extended or adjusted under 35 U.S.C. 154(b) by 0 days.

(21) Appl. No.: 11/324,426

(22) Filed: Jan. 3, 2006

(65) Prior Publication Data

US 2006/0152185 A1 Jul. 13, 2006

(30) Foreign Application Priority Data

Jan. 12, 2005 (KR) ...................... 10-2005-0002945

(51) Int. Cl.
*G05B 11/28* (2006.01)

(52) U.S. Cl. ...................... 318/599; 318/254; 318/138; 318/439; 318/375; 318/432; 318/433; 318/434; 388/812

(58) Field of Classification Search ................ 318/599, 318/254, 138, 439, 375, 376, 432, 433, 434; 388/812, 811; 323/282
See application file for complete search history.

(56) References Cited

U.S. PATENT DOCUMENTS

| | | | | |
|---|---|---|---|---|
| 5,491,429 | A * | 2/1996 | Gasparik | 326/27 |
| 6,366,038 | B1 | 4/2002 | Bohm | |
| 2004/0178733 | A1 * | 9/2004 | Tukamoto et al. | 313/634 |

FOREIGN PATENT DOCUMENTS

| | | |
|---|---|---|
| GB | 1436804 | 5/1976 |
| JP | 06-291379 | 10/1994 |
| JP | 2002-272179 | 9/2002 |
| JP | 2004-225229 | 8/2004 |

* cited by examiner

*Primary Examiner*—Karen Masih
(74) *Attorney, Agent, or Firm*—Gerald E. Helget; Nelson R. Capes; Briggs and Morgan, P.A.

(57) ABSTRACT

The present invention relates to an actuator current control method. The method of the present invention comprising the steps of measuring a feedback current passing through an actuator, determining PWM duty according to an error component between a target current produced based on an input signal and the feedback current to generate a PWM signal, controlling a current supplied to the actuator based on the PWM signal, and monitoring the feedback current at a time difference of a half period in every period of the PWM signal to estimate an average current and then determining based on the estimated average current whether or not the control of the supplied current has failed. According to the present invention, an algorithm for monitoring a feedback current at a time difference of a half period in every period of the PWM signal to estimate an average current when measuring the average current of the actuator feedback current can be employed. Therefore, since a digital filter such as a low pass filter is not used, any time delay other than the time delay due to the inductance in the actuator is not generated. Accordingly, the reliability of the system (i.e., actuator current control device) can be increased. Furthermore, since the control circuit can be simplified, the system reliability can be ensured due to the minimization of the number of the electronic components and the economical efficiency of the system can be thus increased.

1 Claim, 4 Drawing Sheets

-Prior Art-

-Prior Art-

ACTUATOR CURRENT CONTROL METHOD

BACKGROUND OF THE INVENTION

1. Field of Invention

The present invention relates to an actuator current control method, and more particularly, to an actuator current control method which controls a current supplied to an actuator including an inductance component such as a proportional control solenoid and motor.

2. Description of the Prior Art

FIGS. 1 and 2 illustrate typical current control devices capable of controlling a related art actuator having an inductance component.

FIG. 1 is a block diagram of an actuator current control device according to a first example of the prior art. This actuator current control device comprises a microcomputer 10, a digital to analog (D/A) converter 21, a differential integrator 22, a pulse width modulated (PWM) pulse generating unit 23, an actuator driving unit 31, an actuator 32, a current sensing unit 41, and a low pass filter 42.

In such an actuator current control device, a target current ($I_c$) produced from an input signal by the microcomputer 10 is converted into an analog signal through the D/A converter 21, and the analog signal is compared with a current signal fed back from the current sensing unit 41 and then differentially integrated by an error ratio through the differential integrator 22. The integration result of the differential integrator 22 is converted into a PWM signal by the PWM pulse generating unit 23, by which the actuator driving unit 31 in turn is operated to control a current supplied to the actuator 32, i.e. to drive the actuator 32.

The current sensing unit 41 senses the current passing through the actuator 32, i.e. a feedback current($I_d$), and the microcomputer 10 monitors the feedback current($I_d$) passing through the low frequency pass filter 42 to determine whether or not the actuator current control device has failed.

FIG. 2 is a block diagram showing an actuator current control device according to a second example of the prior art. This actuator current control device comprises an actuator driving unit 31, an actuator 32, a current sensing unit 41, a low pass filter 42, and a microcomputer 50 including a proportional integral (PI) controller 51.

In such an actuator current control device, the microcomputer 50 performs the same functions as those of the D/A converter 21, the differential integrator 22 and the PWM pulse generating unit 23 of the actuator current control device shown in FIG. 1. This is also referred to as a software feedback system. To this end, PWM duty is determined by the PI controller 51 of the microcomputer 50, and the PWM signal controls the current supplied to the actuator 32.

First, a control logic of the microcomputer 50 produces a target current($I_c$) based on an input signal and the current sensing unit 41 senses a current passing through the actuator 32, i.e. the feedback current($I_d$).

When the target current($I_c$) and the feedback current($I_d$) are inputted, the PI controller 51 determines the PWM duty based on an error component between the target current($I_c$) and the feedback current($I_d$) and then outputs the PWM signal via a PWM port.

The actuator driving unit 31 connected to the PWM port of the microcomputer 50 is operated by the PWM signal and controls the current supplied to the actuator 32 to drive the actuator 32.

The microcomputer 50 monitors the feedback current($I_d$) passing through the low pass filter 42 to determine whether or not the actuator current control device has failed.

However, the aforementioned related art actuator current control devices have the following problems.

According to the first example of the related art actuator current control device, there is a problem in that the reliability and economical efficiency thereof are decreased due to the complexity of the analog circuit. Since the more the circuit is complicated, the more electronic components are used, there is a disadvantage in that the overall performance of the circuit may be significantly decreased if there are any unreliable components among the many electronic components.

Further, according to the second example of the related art actuator current control device, the reliability and economical efficiency thereof have been slightly increased by employing the software feedback system. However, several problems may occur since a signal passing through the low pass filter with a low cutoff frequency is used when a feedback average current is estimated. In order to eliminate the effect of a counter electromotive force due to the inductance of the actuator and smooth the pulsating current waveform, an RC filter with high capacitance is used as the low pass filter. Therefore, there is another problem in that a system control response is lowered due to a considerable time delay occurring when measuring the actual current supplied to the actuator.

SUMMARY OF THE INVENTION

The present invention is conceived to solve the aforementioned problems in the prior art. An object of the present invention is not only to increase reliability, economical efficiency and performance of an actuator current control device but also to improve system performance due to the simplification of circuit and minimization of the number of parts obtained by employing an algorithm for monitoring a feedback current at a time difference of a half period in every period of the PWM signal to estimate an average current when measuring the average current of the actuator feedback current.

According to an aspect of the present invention for achieving the object, there is provided an actuator current control method, comprising the steps of measuring a feedback current passing through an actuator, determining PWM duty according to an error component between a target current produced based on an input signal and the feedback current to generate a PWM signal, controlling a current supplied to the actuator based on the PWM signal, and monitoring the feedback current at a time difference of a half period in every period of the PWM signal to estimate an average current and then determining based on the estimated average current whether or not the control of the supplied current has failed.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

A variety of preferred embodiments of the present invention may be implemented herein. Hereinafter, a specific preferred embodiment of the present invention will be described with reference to the accompanying drawings. The above and other objects, features and advantages of the present invention can be better understood through the detailed description on the preferred embodiment.

Figure 1:
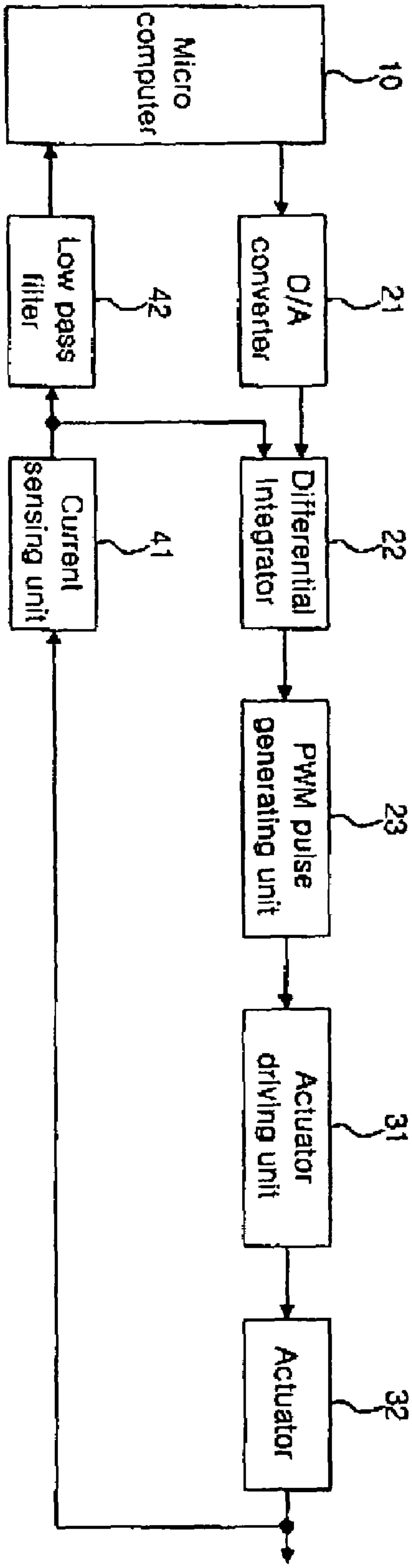
FIG. 1 is a block diagram of an actuator current control device according to a first example of the prior art.
Figure 2:
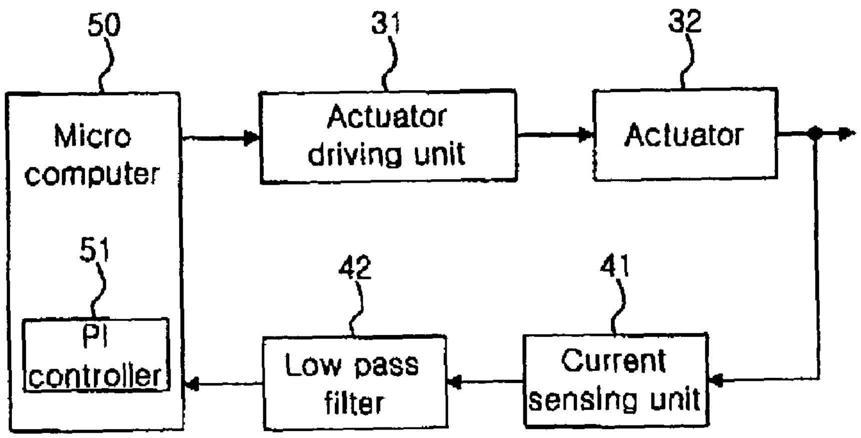
FIG. 2 is a block diagram of an actuator current control device according to a second example of the prior art.
Figure 3:
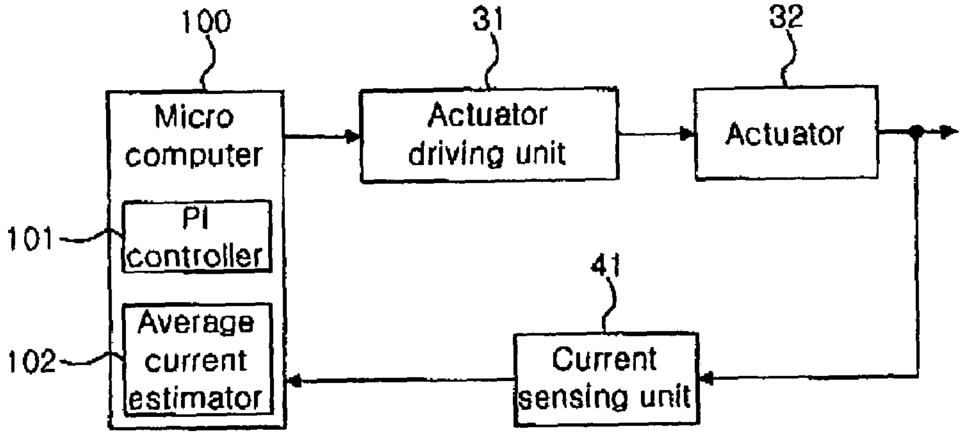
FIG. 3 is a block diagram of a current control device capable of performing an actuator current control method according to the present invention.

FIG. 3 shows a block diagram of an actuator current control device capable of performing an actuator current control method according to the present invention. Referring to this figure, the actuator current control device comprises an actuator driving unit 31, an actuator 32, a current sensing unit 41, and a microcomputer 100 including a PI controller 101 and an average current estimator 102.

The microcomputer 100 produces a target current($I_c$) according to an input signal by a control logic. When a feedback current($I_d$) is inputted from the current sensing unit 41, the PI controller 101 determines PWM duty based on an error component between the target current($I_c$) and the feedback current($I_d$) and then outputs a PWM signal via a PWM port. Further, the average current estimator 102 monitors the feedback current($I_d$) at a time difference of a half period in every period of the PWM signal to estimate an average current and then determines based on the estimated average current whether or not the actuator current control device has failed.

The current sensing unit 41 senses a current passing through the actuator 32, i.e. the feedback current($I_d$) and then inputs the detected current to the microcomputer 100.

The actuator driving unit 31 that is connected to the PWM port of the microcomputer 100 is operated by the PWM signal and controls the current supplied to the actuator 32 to drive the actuator 32.

The detailed operating process of the actuator current control method according to the present invention performed by the actuator current control device so configured will be explained below with reference to FIGS. 3 to 7.

First, the control logic of the microcomputer 100 produces the target current($I_c$) according to the input signal, and the current sensing unit 41 senses the current passing through the actuator 32, i.e. the feedback current($I_d$).

When the target current($I_c$) and feedback current($I_d$) are inputted from the current sensing unit 41, the PI controller 101 determines the PWM duty based on the error component between the target current($I_c$) and feedback current($I_d$) and then outputs the PWM signal via the PWM port. Here, the PI controller 101 outputs the PWM signal to increase the PWM duty if the error component is positive, whereas the PI controller 101 outputs the PWM signal to decrease the PWM duty if the error component is negative.

The actuator driving unit 31 that is connected to the PWM port of the microcomputer 100 is operated by the PWM signal and controls the current supplied to the actuator 31 to drive the actuator 32.

The average current estimator 102 of the microcomputer 100 monitors the feedback current($I_d$) at a time difference of a half period in every period of the PWM signal to estimate an average current and then determines based on the estimated average current whether or not the actuator current control device has failed. That is, the average current estimator 102 determines based upon the PWM signal whether or not there is an error in the process of controlling the current supplied to the actuator 32.

The method of estimating an average current by means of the average current estimator 102 will be verified with reference to FIGS. 4 to 7.

Figure 4:
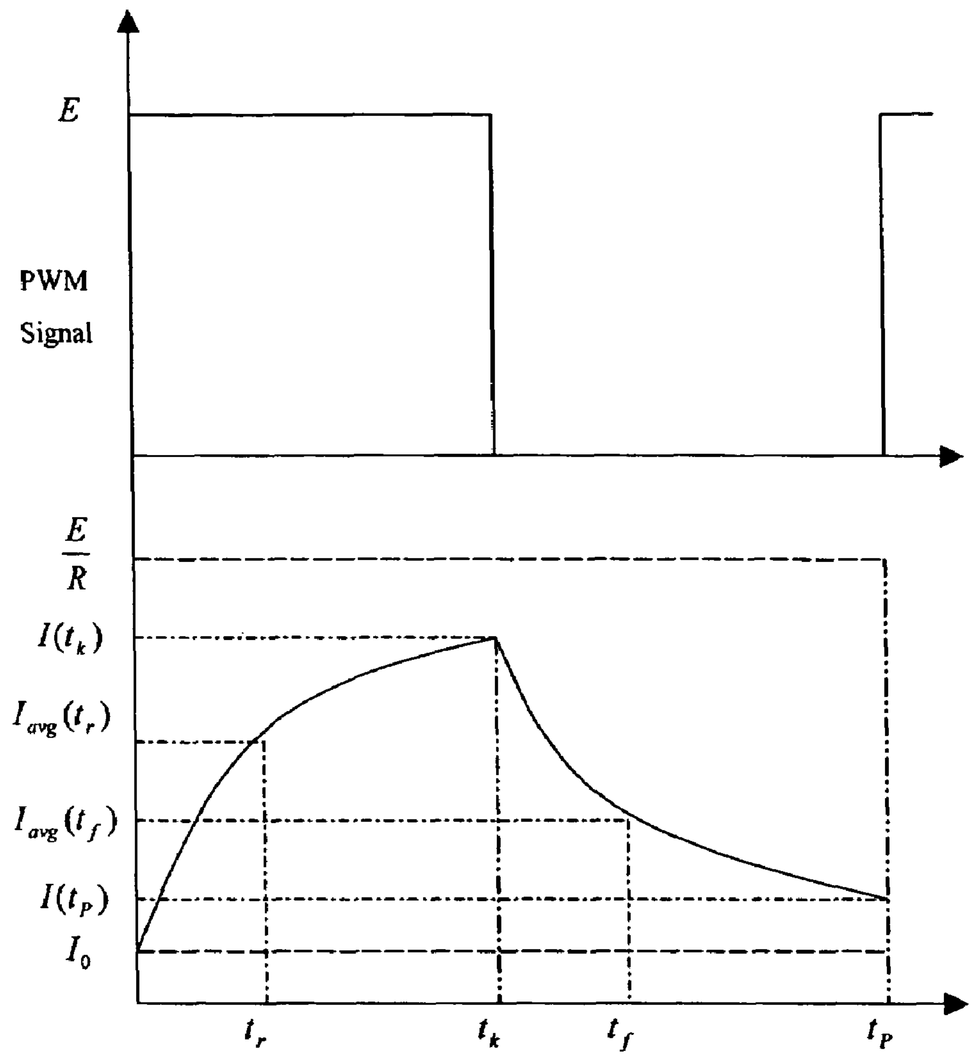
FIG. 4 is a waveform diagram illustrating a relationship between a PWM signal applied to an actuator of the current control device shown in FIG. 3 and a current pattern corresponding to the PWM signal.

FIG. 4 is a waveform diagram schematically showing the relationship between the PWM signal and the corresponding current pattern when the PWM signal with a period of $t_p$ is applied to the actuator.

In FIG. 4, when the PWM signal is at a high level, the actuator current at any point of $t_r$ is approximated by the following Equation (1):

$$I(t_r) = \frac{E}{R} + \left(I_0 - \frac{E}{R}\right)e^{-\frac{R}{L}t_r} \tag{1}$$

where E is a battery voltage, R is an internal resistance of the actuator, $I_0$ is an initial current of the actuator, and L is an inductance of the actuator.

Therefore, when the PWM signal is at a peak level, the actuator current is expressed by the following Equation (2):

$$I(t_k) = \frac{E}{R} + \left(I_0 - \frac{E}{R}\right)e^{-\frac{R}{L}t_k} \tag{2}$$

Further, when the PWM signal is at a low and the bottom level, actuator currents are expressed as the following Equations (3) and (4), respectively.

$$I(t_f) = I(t_k)e^{-\frac{R}{L}t_f} \tag{3}$$

$$I(t_p) = I(t_k)e^{-\frac{R}{L}(t_p - t_k)} \tag{4}$$

If the actuator is continuously driven at constant duty, a resistance in the actuator is increased and a current in the actuator current is gradually decreased by heat. However, the actuator is consequently saturated into a constant current. At this time, $I_0$ in Equation (2) becomes the actuator current at the bottom. Therefore, if $I_0$ is substituted by Equation (4), the actuator current at the peak has a series form such as the following Equation (5):

$$I_{sat}(t_k) = \frac{E}{R}\left(1 - e^{-\frac{R}{L}t_k}\right)\left(1 + e^{-\frac{R}{L}t_p} + e^{-2\frac{R}{L}t_p} + \Lambda\right) \quad (5)$$

By rearranging Equation (5), the following Equation (6) is obtained:

$$I_{sat}(t_k) = \frac{E}{R}\frac{\left(1 - e^{-\frac{R}{L}t_k}\right)}{\left(1 - e^{-\frac{R}{L}t_p}\right)} \quad (6)$$

Further, the actuator current at the bottom is obtained as the following Equation (7) by Equations (4) and (6):

$$I_{sat}(t_k) = \frac{E}{R}\frac{\left(1 - e^{-\frac{R}{L}t_k}\right)}{\left(1 - e^{-\frac{R}{L}t_p}\right)}\frac{e^{-\frac{R}{L}t_p}}{e^{-\frac{R}{L}t_k}} \quad (7)$$

Therefore, a peak-to-peak actuator current at the constant duty of $t_k$ is obtained as the following Equation (8) by Equations (6) and (7):

$$I_{pp}(t_k) = \frac{E}{R}\frac{\left(1 - e^{-\frac{R}{L}t_k}\right)}{\left(1 - e^{-\frac{R}{L}t_p}\right)}\left(1 - \frac{e^{-\frac{R}{L}t_p}}{e^{-\frac{R}{L}t_k}}\right) \quad (8)$$

The following electric specification is provided as an example of analyzing the actuator current ripples:

R=6.5 Ω(actuator saturation resistance+shunt resistance)

L=9.9 mH at 1 kHz

Figure 5:
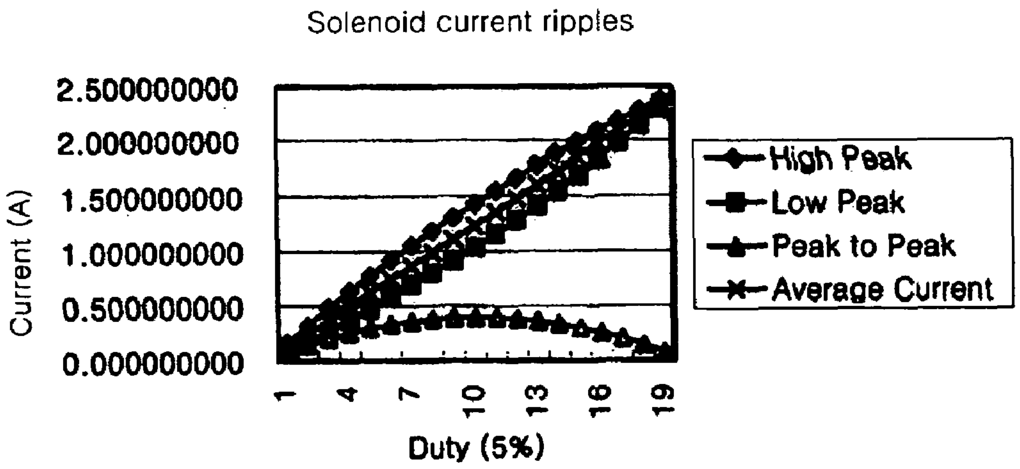
FIG. 5 is a graph illustrating current ripples generated in the actuator of the current control device shown in FIG. 3.

At this time, when the battery voltage is 16 V, the ripples obtained by Equation (8) are shown in FIG. 5. Here, FIG. 5 is a graph plotting the current ripples generated in a solenoid as an example of the actuator.

The average actuator current is an arithmetic average value of two peak actuator currents. If the actuator current is detected at any one point in the PWM period without passing through a low pass filter, a actuator current error corresponding to a half of the peak-to-peak current is generated.

When Equations (1) and (3) are integrated at each time interval and divided by each time value, when the PWM signal at high and low levels, average currents $I_{avg}(t_r)$ and $I_{avg}(t_f)$ thereof are obtained by the following Equations (9) and (10):

$$I_{avg}(t_r) = \frac{E}{R} + \frac{L}{Rt_k}\left(I_0 - \frac{E}{R}\right)\left(1 - e^{-\frac{R}{L}t_k}\right) \quad (9)$$

-continued $$I_{avg}(t_f) = I(t_k)\frac{L}{R(t_p - t_k)}\left(1 - e^{-\frac{R}{L}(t_p - t_k)}\right) \quad (10)$$

If the actuator current is saturated, $I_0$ is obtained by Equation (7), and $I(t_k)$ is obtained by Equation 6. By substituting and rearranging the equations, the following Equations (11) and (12) are obtained:

$$I_{avg}(t_r) = \frac{E}{R} + \frac{L}{Rt_k}\left(I_{sat}(t_p) - \frac{E}{R}\right)\left(1 - e^{-\frac{R}{L}t_k}\right) \quad (11)$$

$$I_{avg}(t_f) = I_{sat}(t_k)\frac{L}{R(t_p - t_k)}\left(1 - e^{-\frac{R}{L}(t_p - t_k)}\right) \quad (12)$$

At this time, a point passing through the average actuator current can be obtained by the following Equations (13) and (14):

$$I(t_r) = I_{avg}(t_r) \quad (13)$$

$$I(t_f) = I_{avg}(t_f) \quad (14)$$

The Equations (13) and (14) are rearranged into the following Equations (15) and (16), respectively:

$$t_r = -\frac{L}{R}\ln\frac{L}{Rt_k}\left(1 - e^{-\frac{R}{L}t_k}\right) \quad (15)$$

$$t_f = -\frac{L}{R}\ln\frac{L}{R(t_p - t_k)}\left(1 - e^{-\frac{R}{L}(t_p - t_k)}\right) \quad (16)$$

Consequently, the average actuator current over one period is obtained as the following Equation (17):

$$I_{avg} = I(t_r)\frac{t_k}{t_p} + I(t_f)\frac{t_p - t_k}{t_p} \quad (17)$$

Therefore, although the average actuator current can be obtained from Equation (17) by monitoring the actuator current at the points of $t_r$ and $t_f$, the method in which the actuator current should be accurately monitored at the relevant points needs a high performance processor.

Figure 6:
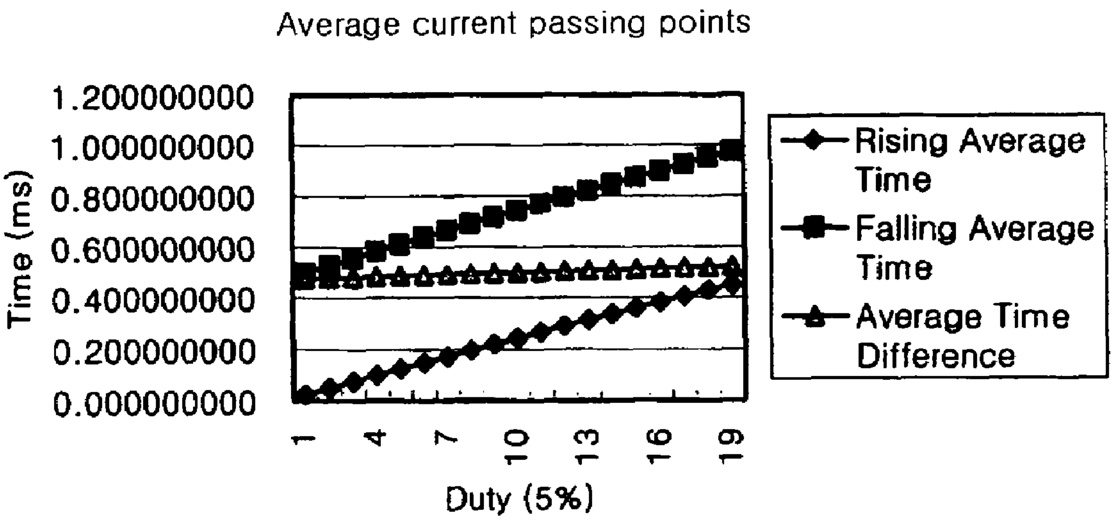
FIG. 6 is a graph illustrating average current passing points of a feedback current generated in the actuator of the current control device shown in FIG. 3.

The average actuator current passing point under the actuator control condition is shown in FIG. 6.

It can be understood from FIG. 6 that a time difference between the average actuator current passing points at the rising and falling of the actuator current corresponds to a half of the PWM period.

Therefore, a method of obtaining the average actuator current by monitoring the actuator current at a time difference of a half period in one PWM period is employed. This is expressed as the following Equation (18):

$$I_{avg} = \frac{I(t_r) + I(t_r + t_p/2)}{2} \quad (18)$$

Figure 7:
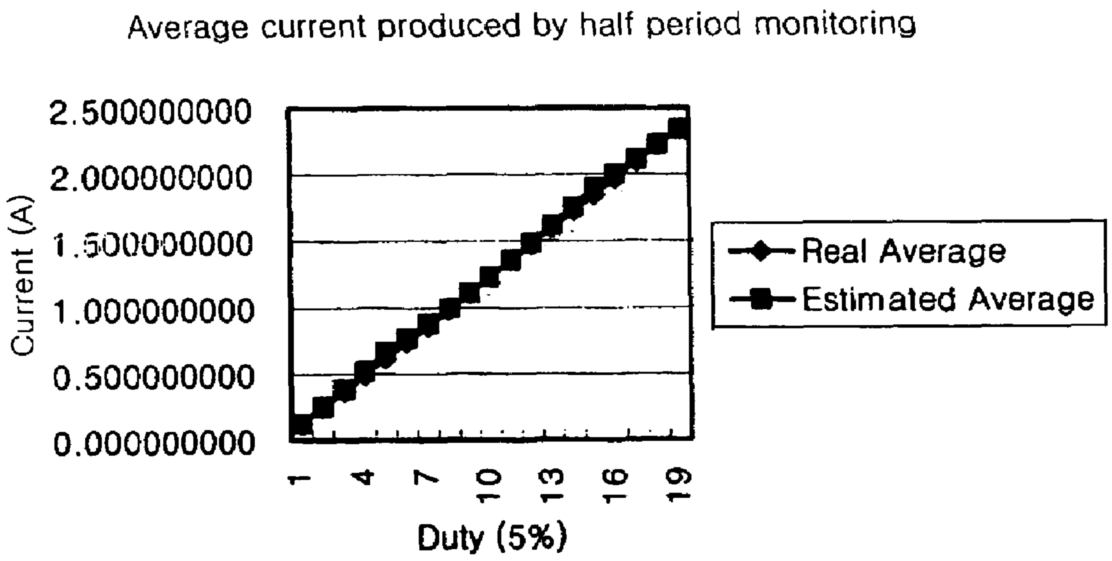
FIG. 7 is a graph illustrating average currents produced by a half period monitoring according to the present invention in the actuator current control device of FIG. 3.

Using the above equation, an approximated average actuator current can be obtained as shown in FIG. 7.

According to the present invention as described above, an algorithm for monitoring a feedback current at a time difference of a half period in every period of the PWM signal to estimate an average current when measuring the average current of the actuator feedback current can be employed. Therefore, since a digital filter such as a low pass filter is not used, any time delay other than the time delay due to the inductance in the actuator is not generated. Accordingly, the reliability of the system (i.e., actuator current control device) can be increased.

Furthermore, since the control circuit can be simplified, the system reliability can be ensured due to the minimization of the number of the electronic components and the economical efficiency of the system can be thus increased.

Although the foregoing description has been described in connection with the preferred embodiment of the present invention, it is apparent to those skilled in the art that various changes and modifications can be made thereto within the technical scope and spirit of the invention as defined in the appended claims.

What is claimed is:

1. An actuator current control method of controlling a current supplied to an actuator including an inductance component, comprising the steps of:

measuring a feedback current passing through the actuator;

determining PWM duty according to an error component between a target current produced based on an input signal and the feedback current to generate a PWM signal;

controlling a current supplied to the actuator based on the PWM signal; and monitoring the feedback current at a time difference of a half period in every period of the PWM signal to estimate an average current and then determining based on the estimated average current whether or not the control of the supplied current has failed.

* * * * *